Patented July 26, 1927.

1,637,023

UNITED STATES PATENT OFFICE.

RICHARD HERZ, OF FRANKFORT-ON-THE-MAIN, GERMANY, ASSIGNOR TO GRASSELLI DYESTUFF CORPORATION, OF NEW YORK, N. Y., A CORPORATION OF DELAWARE.

REACTION PRODUCT OF SULPHUR DICHLORIDE AND PRIMARY ARYLAMINES.

No Drawing. Application filed August 31, 1921, Serial No. 497,435, and in Germany April 11, 1914.

The subject matter of my invention is a series of new and very varied aromatic substances containing nitrogen, sulphur and chlorine. They are formed by the action of disulphur dichloride ($S_2Cl_2$) on primary arylamines and substitution products thereof, which contain in their molecule at least one amino group and one unsubstituted hydrogen in ortho position thereto. The new reaction is generally applicable to aniline and its homologues, to α and β naphthylamine, to aminophenols, to aminoarylhydroxyalkyl- and aminoarylthioalkylethers, to m- and p-aryldiamines, such as m- or p-phenylene diamine, benzidine, tolidine, dianisidine and the acidyl derivatives of these bases and also to the substitution products of all these arylamino-compounds, including the sulfonic- and carboxylic acids.

The reaction runs probably in such a way, that the S—S/Cl-group enters in the ortho position to the amino-group, or aminogroups respectively, forming with same a new ring, consisting of N, $S_2$ and Cl; in some cases besides the formation of this peculiar new ring, a chlorination of the aromatic nucleus takes place. The new substances possessing probably the following general chemical constitution:

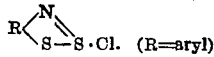  (R=aryl)

are very useful raw materials for the production of valuable dyestuff and pharmaceutical compounds and are intended to be used as such. They are in a dry state yellow to orange, to red to brown, to dark colored substances soluble with their own color in water and alcohol, and are distinguished by the following characteristic properties:—

(1.) When brought into contact with aromatic bases such as aniline, toluidine, etc., most of them yield red to violet, to blue to green colorings, which, as I have ascertained, represent unstable basic dyestuffs containing sulphur.

(2.) They react with water by splitting off hydrochloric acid and forming new ring compounds of probably the following general constitution:

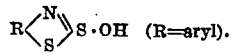  (R=aryl).

(3.) If the original substances or these latter products of transformation are treated in a suitable manner with alkalies, the ring is split and new compounds result which when condensed in an alkaline solution with monochloracetic acid form new condensation products having the character of o-aminoarylthioglycolic acids.

These latter reactions form together with the converting of these condensation products into new and valuable vat dyestuffs the subject matter of my U. S. Patents Nos. 1,243,170 and 1,243,171.

In carrying out the new process into practical effect, I may start either from the free aminocompounds or from their dry salts (preferably mineral acid salts) or from the acidyl- compounds.

I prefer to employ generally the dry salts (aminosulfonic- or aminocarboxylic acids excepted) because the reaction runs more smoothly with these than with the free bases. When these latter compounds or their acidyl derivatives are used, the first phase of the reaction is always the formation of the hydrochloride of the base employed.

Further on the process may be worked with or without the addition of a suitable diluent which takes no part in the reaction, as, for instance, benzene, naphtha, glacial acetic acid or formic acid free from water. When free amino bases are used which react rather violently with the disulphur dichloride, the reaction should be restrained by adding such a suitable diluting agent.

It is essential for obtaining a favorable result that the temperature of the reaction is kept below the boiling point of the disulphur dichloride, that is, not above about 120° C. and preferably not below about 40° C., as at more elevated temperatures more complicated substances result which I do not claim and that at least 2 to 3 molecules of disulphur dichloride to 1 molecule of base, or 1 amino group respectively are used, according to the following general equations which represent the probable course of the reaction:

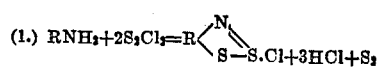

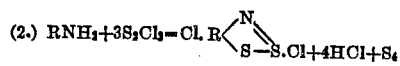

(R=aryl).

Preferably an excess above these theoretical figures is employed say for 1 part of amino compound, 4 to 10 parts of disulphur dichloride, or, calculated on molecular quantities, for one mol of the amino compound or respectively one amino group from about 4 to about 10 mols of disulphur dichloride, as then the yield in most cases is a quantitative one.

The process is illustrated by the following examples:—

*Example I.*—100 kilos dry well ground aniline hydrochloride are heated in a suitable vessel fitted with a stirrer with five to ten times the quantity of disulphur dichloride ($S_2Cl_2$), that is, one mol of inilinhydrochloride to from 4.8 to 9.6 mols of disulphur dichloride, to 50°–70° C. until a test can no longer be diazotized and coupled. It is then diluted with an anhydrous, inert diluting agent, such as naphtha, benzene, ligroin, etc., the separating body is removed by suction, washed with one of the hydrocarbons mentioned, freed from any excess of sulphur chloride that may adhere to it, and dried, preferably in a vacuum at as low a temperature as possible. The yield is quantitative. When dried it is a yellow crystalline powder soluble with a yellowish brown color in water, insoluble in ether, benzene, carbon bisulfide and ligroin, etc., difficultly soluble in cold glacial acetic acid and yielding yellow crystalline needles when precipitated from these solutions with benzene or ether. With aniline oil the body at once reacts forming an intense bluish violet basic dyestuff. Bodies of quite similar properties are produced when using dry hydrochlorides of o-, p- and m-chloraniline, o- and m-toluidine, p-xylidine, etc.

*Example II.*—20 kilos aniline are mixed with the same volume of benzene, ligroin, or solvent naphtha and gradually added to a mixture of 120 kilos disulphur dichloride, that is, one mol of aniline to about 4 mols of disulphur dichloride, and 600 kilos of one of the above mentioned hydrocarbons. The mixture becomes warm, and aniline hydrochloride and sulphur separate from the solution. The whole is then heated while stirring at 70° to 100° C. until a sample is no longer diazotizable. When cold, the separated yellowish brown substance is filtered and purified as described in Example I. It is identical with the substance produced according to Example I. In exactly the same manner the products of reaction of o- and m-toluidine and of analogous bases are obtained.

*Example III.*—20 kilos acetanilide are heated with 5 to 10 times their weight of disulphur dichloride, that is, one mol of acetanilide to from about 5 to about 10 mols of disulphur dichloride, for 10 to 20 hours at 70° to 100° C. When the reaction is finished, the mass is diluted with a suitable dry hydrocarbon and the product of reaction is separated as described in Example I; it is identical in all its properties with the product of reaction of disulphur dichloride on aniline hydrochloride.

*Example IV.*—20 kilos of hydrochloride, or sulfate, or oxalate of β naphthylamine are mixed with 100 to 200 kilos of disulphur dichloride, that is, one mol of β-naphthylamine to form about 6.6 to about 13 mols of disulphur dichloride, and the mixture is warmed to 40° to 60° C. while stirring well until a test can no longer be diazotized. The new substance is isolated as described in Example I. In a dry state it forms an orange powder which dissolves in water with the same color. After a short time from such aqueous solution yellowish white leaflets crystallize out whereas the solution shows a strong acid reaction.

*Example V.*—25 kilos of o-anisidine are mixed with about 50 kilos glacial acetic acid and then very slowly added, while stirring and cooling well, to about 150 kilos disulphur dichloride, that is, one mol of o-anisidine to about 5.5 mols of disulphur dichloride; stirring is continued for some hours at ordinary temperature, then it is gradually warmed to 40° to 60° C. until a test can no longer be diazotized. The new substance, if isolated as described in the foregoing examples, is in a dry state a yellowish orange powder which dissolves with the same color in water. This aqueous solution is pretty stable, but after addition of some acetate of sodium or sodium carbonate it becomes colorless and white leaflets crystallizing out.

*Example VI.*—10 kilos benzidine or the corresponding amount of benzidine hydrochloride are introduced in a mixture of 50 kilos glacial acetic acid and 50 to 80 kilos disulphur dichloride, that is, one mol of benzidine to from about 3.4 to about 5.5 mols of disulphur dichloride. The whole is heated while stirring for some hours from 90° to 120° C. until a test can no longer be diazotized. It is isolated as described above. In a dry state it is a dark violet crystalline powder soluble with a claret-red color in water. By warming this solution it soon becomes colorless and greenish white leaflets are precipitated. With aniline oil it produces a green unstable coloring.

Having now particularly described and ascertained the nature of my said invention and in what manner the same is to be performed, I declare that what I claim is:

1. The manufacture of new aromatic substances containing sulphur, nitrogen and chlorine in their molecule by the reaction of an excess over equimolecular proportions of disulphur dichloride ($S_2Cl_2$) on primary arylamines having at least one amino group and one unsubstituted hydrogen in ortho position thereto at temperatures below the boiling point of the disulphur dichloride, substantially as described.

2. A process as claimed in claim 1 in which the salts of primary arylamines are used, substantially as described.

3. A process as claimed in claim 1 in which the reaction is carried out in presence of a suitable diluting agent which itself takes no part in the reaction substantially as described.

4. As new articles of manufacture the new aromatic substances derived from the reaction of an excess over equimolecular proportions of disulphur dichloride on primary arylamines having probably the following general chemical constitution.

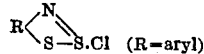

said substances being in a dry state yellow, to orange to red, to brown to dark colored powders soluble with their own color in water and alcohol and glacial acetic acid, almost insoluble in ether, benzene, carbon disulfide and petroleum ether, being transformed by the action of water—while hydrochloric acid is split off—into new substances possessing probably the following general chemical constitution

forming with aromatic bases, such as aniline, toluidines, xylidines, etc., red to violet, to blue to green colorings which are unstable to alkalies, and combining in an alkaline solution with monochloracetic acid whereby new compounds of the character of o-aminoarylthioglycolic acids are formed, all substantially as described herein.

5. Process for the production of aromatic substances containing sulphur, nitrogen and chlorine which comprises reacting upon a primary arylamine compound having at least one amino group and one unsubstituted hydrogen in ortho position thereto with a quantity of disulphur dichloride amounting to from two to ten molecules thereof for each amino group at a temperature below the boiling point of the disulphur dichloride.

6. Process for the production of aromatic substances containing sulphur, nitrogen and chlorine which comprises heating a mixture containing a primary arylamine compound having at least one amino group and one unsubstituted hydrogen in ortho position thereto and disulphur dichloride in the molecular ratio of from two to ten molecules of the disulphur dichloride for each amino group at a temperature materially below the boiling point of disulphur dichloride.

7. Process for the production of aromatic substances containing nitrogen, sulphur and chlorine which comprises heating at a temperature of from 40° to 120° C. a reaction mixture containing a primary arylamine compound having at least one amino group and one unsubstituted hydrogen in ortho position thereto and disulphur dichloride in the molecular proportions of from two to ten molecules of the disulphur dichloride for each animo group.

8. As new products compounds substantially identical with those obtainable by the hereindescribed process which consists essentially in reacting upon a primary arylamine containing at least one amino group and an unsubstituted hydrogen in ortho position thereto with at least two molecules of disulphur dichloride for each amino group at an elevated temperature below the boiling point of disulphur dichloride, said compounds having probably the general formula

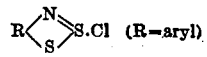

said substances being in a dry state yellow, to orange to red, to brown to dark colored powders soluble with their own color in water and alcohol and glacial acetic acid, almost insoluble in ether, benzene, carbondisulphide and petroleum ether, being transformed by the action of water—while hydrochloric acid is split off—into new substances possessing probably the following general chemical constitution

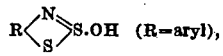

forming with aromatic bases, such as aniline, toluidines, xylidines, etc., red to violet, to blue to green colorings which are unstable to alkalies, and combining in an alkaline solution with monochloracetic acid whereby new compounds of the character of o-aminoarylthioglycolic acids are formed, all substantially as described herein.

In witness whereof I have hereunto signed my name this tenth day of August 1921.

RICHARD HERZ, Ph. D.